April 20, 1948. O. G. SCHMIDT 2,440,212
FLAT TOP CONVEYER CHAIN
Filed Feb. 4, 1946
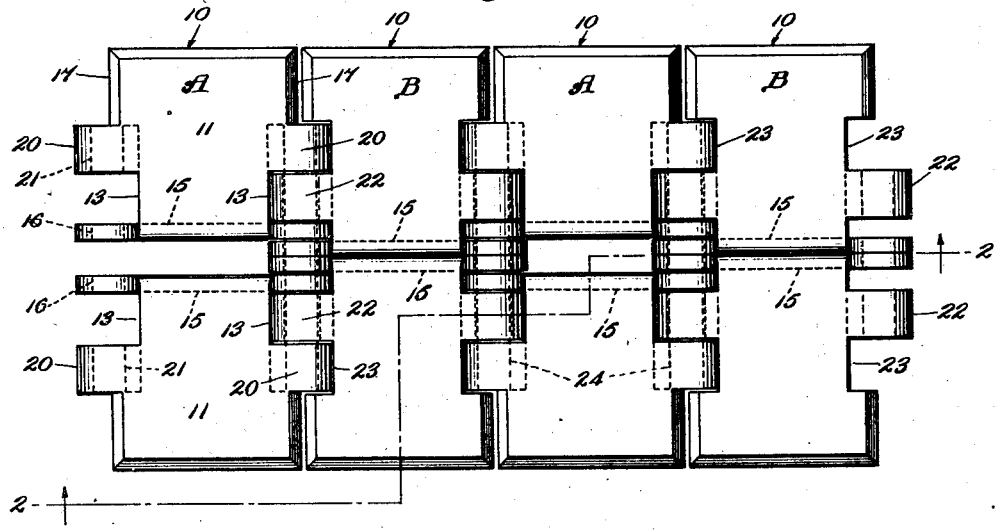
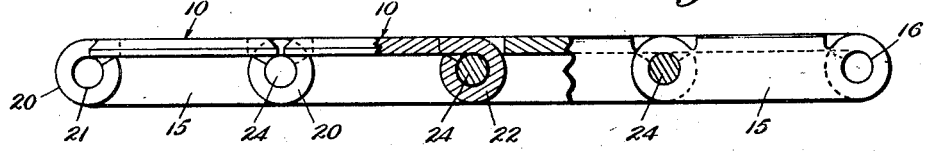
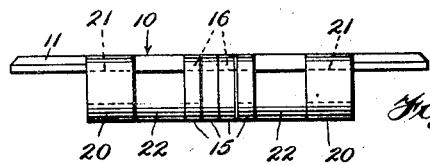
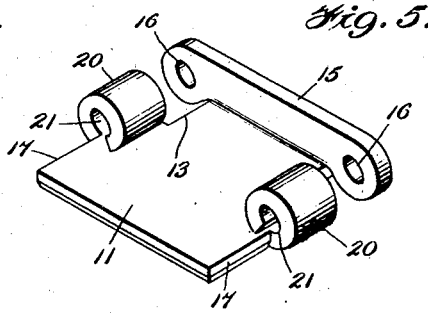
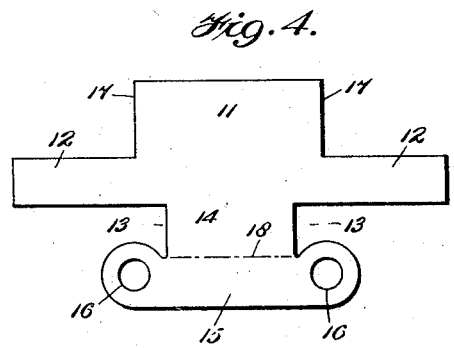
Inventor
Oliver G. Schmidt,
Attorney Patented Apr. 20, 1948

2,440,212

UNITED STATES PATENT OFFICE 2,440,212

FLAT TOP CONVEYER CHAIN

Oliver G. Schmidt, West Allis, Wis., assignor to Chain Belt Company, Milwaukee, Wis., a corporation of Wisconsin Application February 4, 1946, Serial No. 645,312

2 Claims. (Cl. 198—189)

The invention relates to chains for power driven "flat-top" conveyers, which is a light duty type of conveyer finding extensive use in food processing industries and the like for the transfer of cans, bottles and similar containers from place to place for the performance of various operations, such as filling, pasteurizing, sealing or capping, labelling, etc.

In one well known form such conveyer chains comprise a series of alined plate-like links which are formed from metal sheets of suitable thickness by appropriate stamping and bending operations. The individual links are of generally rectangular shape and their transverse edges are formed with staggered knuckles which are interfitted and alined with those of an adjacent link to provide tubular barrels in which chain pins are positioned to complete knuckle joints connecting the links for articulation when passing around the sprockets. The knuckles are conveniently formed by bending or curling integral tongues projecting from each transverse edge of a link blank to tubular form at the under side of the link, whereby the knuckles may engage between the teeth of the sprockets and serve as driving projections for the chain while leaving the upper or article supporting surface of the links substantially planar and free from obstructions. The knuckles at the respective edges of each link of course are properly transversely spaced to mate or interfit with those at the complemental edge of an adjacent link.

In some cases the chain pins are retained in position by expanding or heading them at each end, while in other instances the pins are press-fitted in knuckles of one link while having a running fit in the mating knuckles of the adjacent link. The knuckles are not completely closed i. e., while the tongues from which they are formed are curled to bring their free ends into contact with or closely adjacent to the under face of the body portion of the link, such tongue ends are not permanently secured to such portion, and the rigidity of the metal of the knuckles is relied upon to prevent them from opening or spreading.

While conveyer chains constructed in the above described manner have been extensively employed in food processing and other machinery with excellent results, it has been found that in some instances, e. g., in unusually long conveyers, overloads may overcome the resistance of the metal of the knuckles and pull the latter at least partially open with consequent looseness of the parts, stretching of the chain, excessive wear, and increased side flexing. Such deterioration may also be induced by unequal or off-center loading of the chain, and since the effects are cumulative they may easily result in the working out of the connecting pins, as well as in possible fatigue and rupture of the metal of the knuckles, especially at the line of tangency with the body portion of the links, with consequent breakage of the chain.

The invention has for its principal object the provision of an improved sheet metal link construction whereby such deterioration may be overcome or materially reduced, and a relatively inexpensive flat-top conveyer chain obtained which will withstand materially greater loads without objectionable distortion, wear and/or breakage than those which have been heretofore proposed.

One form of this improved construction is illustrated in the accompanying drawing forming a part of this specification, in which:

Figure 1 is a plan view of a portion of a flat-top conveyer chain composed of links constructed in accordance with the invention;

Fig. 2 is a sectional-elevational view thereof, on the planes indicated by the line 2—2 of Fig. 1;

Fig. 3 is an end elevational view, as seen from the left of Fig. 2;

Fig. 4 is a plan view of a blank from which one of the link elements may be formed; and Fig. 5 is a perspective view of a completed element formed from the blank of Fig. 4.

As will be readily understood from the said drawing, each link comprises two complemental elements, which may be duplicates of one another reversely positioned side by side; and while the construction of all of the links is essentially similar, that of alternate links (designated A and B respectively) differs slightly in detail, as will appear more fully below.

Each element 10 of the links A may be formed from a stamped metal blank such as shown in Fig. 4, which comprises a body portion 11 from each side of which a tongue 12 extends. Below these tongues the blank is cut back as at 13 to provide recesses which accommodate the mating knuckles of an adjacent link (see Fig. 1), and the lowermost portion 14 of the blank extends somewhat beyond the inner edges of these recesses. These projections are preferably rounded substantially as shown, and are provided with punched or drilled chain pin apertures 16, the centers of which are approximately alined with the side edges 17 of the body portion 11.

To complete the link element shown in Fig. 4 from this blank, the tongues 12 are curled by an appropriate bending operation to form tubular knuckles 20, the axes of which are also approximately alined with the edges 17 of the body portion; and the lower part 14 of the blank is bent along the broken line 18 to a position at substantially right angles to the body portion whereby to constitute an integral reach bar 15 extending along a longitudinal edge of the finished element, the pin apertures 16 of which are alined with the pin receiving bores 21 of the knuckles 20.

As will be clear from Fig. 1, two elements constructed as just described are employed to form a link A, such elements being reversely positioned with respect to one another, with their reach bars 15 adjacent and paralleling the median line of the chain. The knuckles 20 at each side of such link are interfitted and alined with complemental knuckles 22 of a link B to form tubular barrels, and chain pins 24 are inserted through the bores thereof and the apertures 16 of the bars 15. The knuckles 20 and 22 still constitute the primary bearings of the knuckle joint, as in prior constructions, but the reach bars 15 so interconnect adjacent chain pins 24 as to relieve the knuckles of strains which would tend to open or distort them.

As above indicated, the elements 10 of the links B are essentially similar to those of links A, the principal differences being that they are slightly longer whereby when assembled their reach bars 15 abut along the median line of the chain, as shown in Fig. 1; their knuckles 22 are located somewhat further from the outer ends of the elements so that they may be received in the recesses 13 of the links A and interfit with the knuckles 20 thereof; and they are cut away as at 23 to accommodate the knuckles 20.

The chain pins 24 are here shown as being press-fitted into the knuckles 20 and the apertures 16 of the bars 15 of the links A, while having a running fit with the complemental elements of the links B, but any other mode of pin retention may be employed so long as it preserves articulation of the links.

What is claimed is:

1. A link for a flat-top conveyer chain, comprising a pair of like metallic plate elements reversely positioned side by side, each of said elements having a planar body portion providing a flat article supporting surface, the opposite transverse edges of said body portions being provided with integral tangential curled knuckles disposed to interfit with companion knuckles on adjacent links and constituting bearings for a chain pin, said body portions also having integral angularly disposed reach bars positioned along their inner longitudinal edges for interconnecting adjacent chain pins to relieve excessive strains on the knuckles.

2. A conveyer chain comprising links as set forth in claim 1, wherein the reach bars of alternate links abut at the median line of the chain and the bars of the remaining links are spaced to either side of said line to receive the ends of the first mentioned bars between them.

OLIVER G. SCHMIDT.

REFERENCES CITED

The following references are of record in the file of this patent:

UNITED STATES PATENTS

| Number | Name | Date |
|---|---|---|
| 1,966,659 | Wynne et al. | July 17, 1934 |
| 2,144,547 | Robinson et al. | Jan. 17, 1939 |
| 2,165,434 | Wilson | July 11, 1939 |